US012791705B2

(12) United States Patent
Gerardiere et al.

(10) Patent No.: US 12,791,705 B2
(45) Date of Patent: Nov. 10, 2026

(54) OBSTACLE DETECTION SYSTEM COMPRISING TWO UWB MODULES FOR A MOTOR VEHICLE

(71) Applicant: Schaeffler Technologies AG & Co. KG, Herzogenaurach (DE)

(72) Inventors: Olivier Gerardiere, Toulouse (FR); Maxime Rateau, Toulouse (FR); Vincent Marimoutou, Toulouse (FR)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 19/132,731

(22) PCT Filed: Jan. 16, 2024

(86) PCT No.: PCT/EP2024/050841
§ 371 (c)(1),
(2) Date: May 23, 2025

(87) PCT Pub. No.: WO2024/153599
PCT Pub. Date: Jul. 25, 2024

(65) Prior Publication Data

US 2026/0194652 A1 Jul. 9, 2026

(30) Foreign Application Priority Data

Jan. 19, 2023 (FR) ....................................... 2300506

(51) Int. Cl.
*B60Q 1/00* (2006.01)
*G01S 7/282* (2006.01)
(Continued)

(52) U.S. Cl.
CPC ............ *G01S 13/931* (2013.01); *G01S 7/282* (2013.01); *G01S 7/292* (2013.01); *G01S 13/003* (2013.01);
(Continued)

(58) Field of Classification Search
CPC ........ G01S 13/931; G01S 7/282; G01S 7/292; G01S 13/003; G01S 2013/9316;
(Continued)

(56) References Cited

U.S. PATENT DOCUMENTS 10,946,833 B2 * 3/2021 Kong ...................... B60R 25/24
11,345,312 B1 * 5/2022 Harris .................... H04B 11/00
(Continued)

FOREIGN PATENT DOCUMENTS

EP 3968050 A1 3/2022
JP 2009217740 A 9/2009
(Continued)

OTHER PUBLICATIONS

International Search Report and Written Opinion of the ISA for PCT/EP2024/050841, dated Apr. 18, 2024, 15 pages.

*Primary Examiner* — Toan N Pham
(74) *Attorney, Agent, or Firm* — NIXON & VANDERHYE

(57) ABSTRACT

An obstacle detection system intended to be installed on a motor vehicle includes a first UWB module for transmitting a transmitted ultra-wideband radio frequency signal, a second UWB module for receiving a received ultra-wideband radio frequency signal, the received signal originating from the transmitted signal and including a first contribution originating directly from the first UWB module, and a second contribution being reflected on an obstacle before reaching the second UWB module, and at least one computer configured to receive data relating to the received signal as input, and to deduce time-of-flight values therefrom and then estimate a distance between the obstacle and the motor vehicle, with each module from among the second UWB module and the first UWB module configured to establish a two-way exchange of radio frequency signals
(Continued)

with a UWB fob and to deduce a current distance value to said UWB fob therefrom.

13 Claims, 5 Drawing Sheets

(51) Int. Cl.
*G01S 7/292* (2006.01)
*G01S 13/00* (2006.01)
*G01S 13/931* (2020.01)

(52) U.S. Cl.
CPC ................ *G01S 2013/9316* (2020.01); *G01S 2013/93271* (2020.01); *G01S 2013/93272* (2020.01); *G01S 2013/93274* (2020.01)

(58) Field of Classification Search
CPC . G01S 2013/93271; G01S 2013/93272; G01S 2013/93274
See application file for complete search history.

(56) References Cited

U.S. PATENT DOCUMENTS

| | | | | |
|---|---|---|---|---|
| 11,575,408 | B2 * | 2/2023 | Lim ...................... | H04B 1/719 |
| 2008/0027591 | A1 | 1/2008 | Lenser et al. | |
| 2017/0369034 | A1 * | 12/2017 | Bilik ...................... | G01S 7/006 |
| 2018/0059231 | A1 | 3/2018 | Dewberry et al. | |
| 2021/0173072 | A1 | 6/2021 | Spick et al. | |
| 2021/0284098 | A1 | 9/2021 | Scott et al. | |

FOREIGN PATENT DOCUMENTS

| | | | |
|---|---|---|---|
| JP | 2018510366 | A | 4/2018 |
| JP | 2021063428 | A | 4/2021 |

* cited by examiner

OBSTACLE DETECTION SYSTEM COMPRISING TWO UWB MODULES FOR A MOTOR VEHICLE

CROSS-REFERENCE TO RELATED APPLICATIONS

This application is the U.S. national phase of International Application No. PCT/EP2024/050841 filed Jan. 16, 2024 which designated the U.S. and claims priority to FR 2300506 filed Jan. 19, 2023, the entire contents of each of which are hereby incorporated by reference.

DESCRIPTION

Technical Field

The invention relates to the field of motor vehicles and more specifically to an obstacle detection system intended to be installed on a motor vehicle in order to detect obstacles located outside the vehicle.

It involves, for example, detecting obstacles as part of driving assistance, or as part of assistance for parking the vehicle. Advantageously, it involves detecting obstacles likely to be found on the path of an opening element of the vehicle, when said opening element is opened.

Prior Art

Obstacle detection systems intended to be installed on a motor vehicle are known in the prior art. Such systems are based, for example, on ultrasound, LIDAR, or RADAR technology. A transmitting and receiving module is configured to send a transmitted signal (ultrasound, light or radio frequency) outside the vehicle, and to receive a return signal resulting from the transmitted signal reflecting on an obstacle. The analysis of the return signal provides information concerning the obstacle, in particular its position.

An aim of the present invention is to propose an obstacle detection system intended to be installed on a motor vehicle, offering improved detection performance capabilities compared with the systems of the prior art, while ensuring minimal bulk on the motor vehicle.

DISCLOSURE OF THE INVENTION

This aim is achieved with an obstacle detection system, intended to be installed on a motor vehicle, for detecting obstacles located outside the vehicle, and which comprises:

- a first UWB module configured to transmit an ultra-wideband radio frequency signal, called transmitted signal, transmitted outside the motor vehicle during use;
- a second UWB module configured to receive an ultra-wideband radio frequency signal, called received signal, with the received signal originating from the transmitted signal and comprising a first contribution and a second contribution, with the first contribution being formed by part of the transmitted signal originating directly from the first module, and the second contribution being formed by part of the transmitted signal being reflected on an obstacle before reaching the second UWB module; and
- at least one computer, called main computer, which can form an integral part of the second UWB module, and which is configured to receive data relating to the received signal as input, and to deduce time-of-flight values therefrom and then estimate a distance between the obstacle and the motor vehicle;

with each module from among the second UWB module and the first UWB module being further configured to establish a two-way exchange of ultra-wideband radio frequency signals with a UWB fob and to determine a current distance value to said UWB fob therefrom.

Throughout this text, the term UWB ("Ultra-Wide Band") refers to a radio frequency signal with low energy and a large spectral width. In particular, a UWB radio frequency signal is defined by a ratio of bandwidth to central frequency that is greater than or equal to 20%, or by a bandwidth of 250 MHz or more.

According to the invention, the signal is transmitted by the first UWB module, and the signal is received by the second UWB module, distinct from the module of the first UWB module. Signal transmission and reception thus occur at two clearly distinct locations on the motor vehicle. This arrangement allows a sufficient amount of signal originating from the reflection on the obstacle to be systematically obtained. However, this is not necessarily the case when the transmission and the reception occur at the same location, depending on the shape of the area of the obstacle where the transmitted signal arrives. The invention thus provides improved detection performance capabilities compared with the systems of the prior art.

Advantageously, during use, the first UWB module and the second UWB module are arranged spaced apart from each other, for example, spaced apart by at least 0.5 meters. Of course, it is understood that, during use, the first and second UWB modules are fixed relative to each other, since they are each fixed at a determined location on the motor vehicle.

Furthermore, according to the invention, signal transmission and signal reception are performed using two UWB modules, which also have the role of communicating with a UWB fob so that it can be identified and located. Such modules are commonly deployed on motor vehicles, for safe distance measurement applications. In other words, the invention re-uses UWB modules by adapting them, which modules are, in any case, usually present on a motor vehicle. The invention thus ensures minimum bulk for the obstacle detection system when it is installed on the motor vehicle. In other words, the invention combines two functions into one with UWB modules: the "conventional" UWB function for locating a fob, notably a smartphone, and an obstacle detection function.

Preferably, the first UWB module and the second UWB module are configured to together establish a two-way communication, and to exchange timestamp data relating to signal transmission and/or reception times, and the main computer is configured to use said timestamp data to obtain said time-of-flight values.

In particular, each module from among the first UWB module and the second UWB module is configured to:

- generate and store timestamp data, relating to signal reception and/or transmission times;
- incorporate such data into a signal it transmits; and
- extract such data from a signal it receives.

The main computer is configured to compute time-of-flight values using timestamp data directly generated on the second UWB module, but also using timestamp data generated on the first UWB module and sent to the second UWB module. The timestamp data can relate to at least one time interval between the reception of a signal by one UWB module and the transmission of a signal in return by the other UWB module. It is thus possible to accurately determine a time-of-flight between the two UWB modules, even if their respective clocks are not perfectly synchronized.

Preferably, the first UWB module and the second UWB module are configured to together establish a two-way communication, and to exchange timestamp data relating to signal transmission and/or reception times, and the main computer is configured to use said timestamp data to obtain said time-of-flight values.

Advantageously, the transmitted signal is made up of a plurality of pulses, with each pulse of the transmitted signal corresponding to two respective pulses of the received signal, respectively associated with the first contribution and with the second contribution, the main computer being configured to:

compute, for each pulse of the received signal, a respective time-of-flight value;

distribute the time-of-flight values into a plurality of classes, where each class is associated with a predetermined range of values of the time-of-flight; and estimate the distance between the obstacle and the motor vehicle using said distribution of the time-of-flight values.

The main computer can be configured to:

identify, on said distribution of the time-of-flight values, two populations respectively associated with the first contribution and with the second contribution;

determine the time difference between the two time-of-flight populations; and estimate the distance between the obstacle and the motor vehicle using said time difference.

Preferably, the system comprises a memory, storing a first table linking together values relating to times-of-flight and distance values between the obstacle and the motor vehicle, and the main computer is configured to estimate the distance between the obstacle and the motor vehicle using said first table.

Advantageously, the main computer is further configured to:

compute a time spread of the population associated with the second contribution;

estimate a size of the obstacle, using the computed time spread.

The system can comprise a memory, storing a second table linking together time spread values and size values of the obstacle, and the main computer is configured to estimate the size of the obstacle using said second table.

Advantageously, the second UWB module comprises an antenna array, and the main computer is configured to:

determine at least one angle of arrival of the received signal, using a time offset between signal reception times by the various antennas of the antenna array;

determine, using the at least one angle of arrival of the received signal and the estimated distance between the obstacle and the motor vehicle, a position of the obstacle relative to the motor vehicle.

Advantageously, the transmitted signal is made up of a plurality of pulses, with each pulse of the transmitted signal corresponding to two respective pulses of the received signal, respectively associated with the first contribution and with the second contribution, the main computer being configured to:

compute, for each pulse of the received signal, a respective angle of arrival value, called elementary angle of arrival value;

distribute the elementary angle of arrival values into a plurality of classes, where each class is associated with a predetermined range of elementary angle of arrival values; and estimate an angle of arrival of the second contribution of the received signal, using said distribution of the elementary angle of arrival values.

The main computer can be configured to:

identify, on said distribution of the elementary angle of arrival values, two populations respectively associated with the first contribution and with the second contribution;

determine the angular deviation between the two populations of elementary angle of arrival values; and estimate the angle of arrival of the second contribution of the received signal, using said angular deviation.

The first UWB module and the second UWB module can be interchangeable, and each form a transceiver UWB module. The term "interchangeable" is understood to mean that they have the same technical features and functions, and that they only substantially differ in terms of their location on the vehicle. In variants, the system according to the invention comprises more than two transceiver UWB modules, for example, four.

The system can comprise a central computer, distinct from or combined with the main computer, and configured to:

receive, from each respective module from among the first UWB module and the second UWB module, a current distance value to the UWB fob;

compute, using said current distance values, a current position of the UWB fob relative to said motor vehicle; and control the locking and/or unlocking of at least one opening element of the motor vehicle, notably as a function of at least one current position of the UWB fob relative to said motor vehicle.

The invention also relates to a vehicle comprising a system according to the invention.

The invention also relates to an obstacle detection method, implemented in an obstacle detection system according to the invention, the method comprising the following steps:

transmitting the transmitted signal, via the first UWB module and outside the motor vehicle;

receiving the received signal, via the second UWB module, with the received signal comprising a first contribution formed by part of the transmitted signal originating directly from the first UWB module, and a second contribution formed by part of the transmitted signal reflected on an obstacle before reaching the second UWB module;

computing, using the main computer, time-of-flight values associated with the received signal, and estimating a distance between the obstacle and the motor vehicle based on said time-of-flight values;

the method further comprising the following steps, implemented within each module from among the second UWB module and the first UWB module:

establishing two-way exchanges between a UWB fob and said first UWB module, respectively the receiver;

determining a current distance value between the UWB fob and said first UWB module, respectively the receiver.

DESCRIPTION OF THE FIGURES

Further features and advantages of the invention will become more clearly apparent upon reading the following description. This description is purely illustrative and should be read with reference to the appended drawings, in which.

DETAILED DESCRIPTION OF AT LEAST ONE EMBODIMENT

Figure 1:
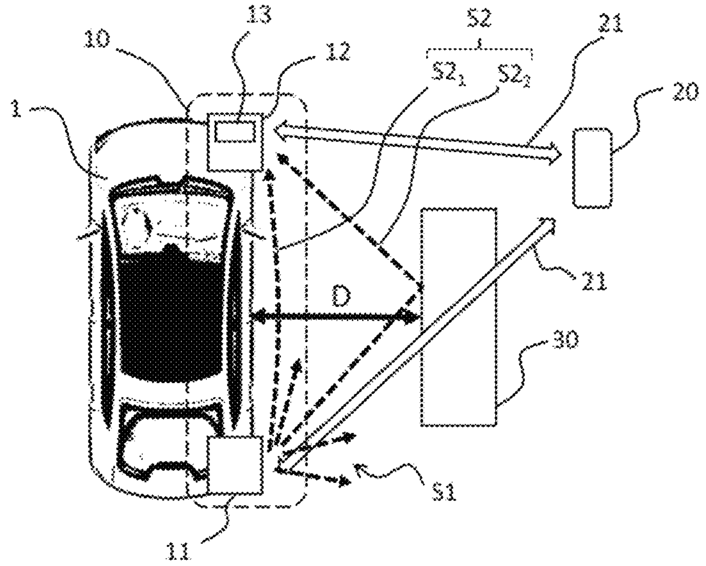
FIG. 1 schematically illustrates an obstacle detection system according to a first embodiment of the invention, installed on a motor vehicle.

FIG. 1 schematically illustrates an obstacle detection system 10 according to the invention, shown during use, installed on a motor vehicle 1.

FIG. 1 also schematically shows an obstacle 30. In this case, but in a non-limiting manner, the obstacle 30 is located opposite a side door of the motor vehicle 1. It is an obstacle that could hinder the opening of the side door, if it is too close to the motor vehicle 30.

The obstacle detection system 10 comprises at least two UWB modules, including a first UWB module 11, and a second UWB module 12.

The obstacle detection system 10 further comprises a computer 13, called main computer. In this case, the main computer 13 is shown as an integral part of the second UWB module 12. As a variant, the main computer 13 can be arranged remote from the first UWB module 11 and the second UWB module 13. For example, the main computer 13 forms part of a central module managing other functions of the vehicle, such as, for example, unlocking the opening elements.

Each module from among the first UWB module 11 and the second UWB module 12 is configured to communicate with a UWB fob 20. This communication is of the two-way type, with each UWB module 11, respectively 12, being capable of both transmitting a signal to the UWB fob 20, and receiving a signal generated by the UWB fob 20. The exchanged signals are UWB type radio frequency signals. In FIG. 1, the two-way communications between the UWB fob and the UWB module 11, respectively 12, are shown by arrows 21.

During use, the UWB fob 20 is carried by a user wishing to access the motor vehicle 1. It comprises a memory storing an authentication code. The UWB fob 20 can be a dedicated device, or can be formed by a smartphone provided with a dedicated application.

Two-way communication with the UWB module 20 allows the UWB modules 11 and 12 to identify and locate the UWB fob. In particular, each UWB module 11, 12 is configured to compute its current distance to the UWB fob 20.

The combination of the different distances to the UWB fob then allows, by triangulation, a position to be obtained of the UWB fob 20 relative to the motor vehicle 1. The triangulation computation is advantageously carried out within a remote computer, not shown in FIG. 1. Each of the first and second UWB modules 11 and 12 therefore comprises a communication interface (not shown) for exchanging data, preferably by a wired channel, with the remote computer.

According to the invention, the first UWB module 11 is configured to transmit a transmitted signal S1, shown in FIG. 1 by a series of dashed arrows. The transmitted signal S1 is transmitted as a cone with a wide angular aperture. It is a UWB type radio frequency signal, transmitted outside the motor vehicle 1 during use.

Only some of the rays of the transmitted signal reach the second UWB module 12 and form the received signal S2. Therefore, the received signal S2 is also a UWB type radio frequency signal.

The received signal S2 comprises at least a first contribution $S2_1$, which corresponds to a portion of the transmitted signal S1 that has propagated directly from the first UWB module 11 to the second UWB module 12, without passing through the obstacle 30.

When an obstacle 30 is present, the received signal S2 further comprises a second contribution $S2_2$, which corresponds to a portion of the transmitted signal S1 that has propagated from the first UWB module 11 to the second UWB module 12, passing through the obstacle 30.

Therefore, the received signal S2 is a signal partly originating from a back-reflection on the obstacle 30. It is not a signal generated by the obstacle 30 itself, unlike signals received from the UWB fob 20.

The main computer 13 is configured to receive data relating to the received signal S2 as input. This data can be simply formed by an electrical signal, resulting from converting the radio frequency signal into an electrical signal.

The main computer 13 is configured to compute time-of-flight values based on the data received as input. A time-of-flight designates a duration that is required for a radio frequency signal to propagate between two points, in particular between the first UWB 11 module and the second UWB module 12 by passing through the obstacle. More details are provided hereafter concerning this computation of time-of-flight values.

The main computer 13 is further configured to estimate a distance D between the obstacle 30 and the motor vehicle 1 based on said time-of-flight values, with the distance and propagation duration notions being linked by the speed of the radio frequency waves in the air.

The distance estimate can be based on a distance computation, based on a hypothesis relating to the position of the obstacle 30 (for example, the obstacle 30 forms an isosceles triangle with the UWB modules 11 and 12). As a variant, the speed estimate is based on the use of a table, linking time-of-flight values and distance values D.

Thus, the invention proposes adapting a system dedicated to identifying and locating a UWB fob, in order to fulfil an additional obstacle detection function. The additional cost and bulk, related to the addition of this obstacle detection function, are therefore minimized.

In practice, obstacle detection can be used:

- when driving the vehicle, to implement driving assistance;
- during a phase of maneuvering the vehicle, to implement maneuvering assistance, notably a maneuver for parking the vehicle; or
- during a phase of opening an opening element (door or trunk), to anticipate any risk of collision between the opening element and an obstacle.

The system according to the invention can be configured to transmit a warning signal when the estimated position of the obstacle involves a risk of collision with the vehicle. In addition or as a variant, the system according to the invention can be configured to transmit a control command, adapted to avoid such a collision. For example, the control command is a command to stop opening the opening element beyond a predetermined opening angle. These additional functions are advantageously implemented by the main computer 13, or by a separate computer.

According to the invention, the signal detected by the second UWB module comprises two contributions $S2_1$, $S2_2$, respectively corresponding to a signal originating directly from the first UWB module and to a signal first reflected on an obstacle. The presence of these two contributions improves the accuracy and the reliability of the distance estimation, as described in further detail hereafter.

According to the invention, the first UWB module 11 and the second UWB module 12 are separate from each other, and are arranged in two different locations on the motor vehicle 1. They are advantageously arranged spaced apart from each other, for example, at the front and at the rear of the vehicle. This arrangement, combined with a signal transmission over a wide angular aperture, allows the signal to be received irrespective of the shape of the obstacle. In particular, even if the transmitted signal intercepts the obstacle in the vicinity of a corner, part of the transmitted signal is returned toward the second UWB module 12. This is not the case when the same UWB module (or radar) performs both the signal transmission and reception functions.

In practice, each module from among the first UWB module 11 and the second UWB module 12 advantageously comprises:

- a transmitting and receiving unit, configured to transmit and/or receive an ultra-wideband radio frequency signal;
- a timestamp unit, configured to generate and store timestamp data, relating to times for transmitting and receiving a signal by said transmitting and receiving unit; and
- a signal processing unit, at least configured to compute current time-of-flight values, notably based on said timestamp data.

Said signal processing unit can be further configured to compute a current distance value to the UWB fob 20, based on at least one current time-of-flight value.

Said signal processing unit can be distinct from or combined with the main computer 13, for example, depending on whether or not the main computer 13 is remote from the second UWB module 12.

Advantageously, the exchanges of signals between the first UWB module 11 and the second UWB module 12 are of the two-way type. For example, the second UWB module 12 can be configured to:

- send a request signal to the first UWB module 11 intended to generate the sending of the signal transmitted by the first UWB module 11; and
- receive the received signal originating from said transmitted signal.

According to other variants, three signals are exchanged, firstly between the first and the second UWB module, then between the second and the first UWB module, and then again between the first and the second UWB module.

Advantageously, each UWB module is then configured to:

- generate and store timestamp data relating to times when it transmits and/or receives the signal (by distinguishing, if applicable, each pulse from the signal, see hereafter);
- incorporate such data into a signal it transmits; and
- extract such data from a signal it receives.

Computing a time-of-flight then takes into account different timestamp data, generated on the first UWB module and the second UWB module.

This timestamp data advantageously relates to at least one time interval between receiving a signal by one of the UWB modules and in response sending a signal to the other UWB module. This allows time-of-flight values to be accurately determined, even when the respective clocks of the two UWB modules are not perfectly synchronized.

In practice, the transmitted signal S1 is advantageously in the form of pulse trains. In other words, the transmitted signal S1 is advantageously formed by a plurality of pulses.

Each pulse 11 of the transmitted signal S1 corresponds to two pulses in the received signal S2:

- a pulse $I2_1$ corresponding to the portion of the pulse 11 that propagated directly from the first UWB module 11 to the second UWB module 12, without passing through the obstacle 30; and
- a pulse $I2_2$ corresponding to the portion of the pulse 11 that propagated from the first UWB module 11 to the second UWB module 12, passing through the obstacle 30.

The pulse $I2_1$ forms part of the first contribution $S2_1$, as mentioned above. The pulse $I2_2$ forms part of the second contribution $S2_2$, as mentioned above.

Advantageously, the main computer 13 is configured to implement the following processing operations:

- compute, for each pulse $I2_1$ and $I2_2$ of the received signal S2, a respective time-of-flight value;
- distribute the time-of-flight values into a plurality of classes, where each class is associated with a predetermined range of values of the time-of-flight; and
- estimate the distance D between the obstacle 30 and the motor vehicle 1 using said distribution of the time-of-flight values.

As described above, computing a time-of-flight takes into account different timestamp data, generated on the first and second UWB modules. This timestamp data in each case is advantageously associated with a pulse in particular, at least with respect to the pulses of the received signal, which are received by the second UWB module at the end of the process. Other timestamp data does not necessarily distinguish the pulses from each other, and does not necessarily take into account a signal portion first reflected on an obstacle.

Figure 2:
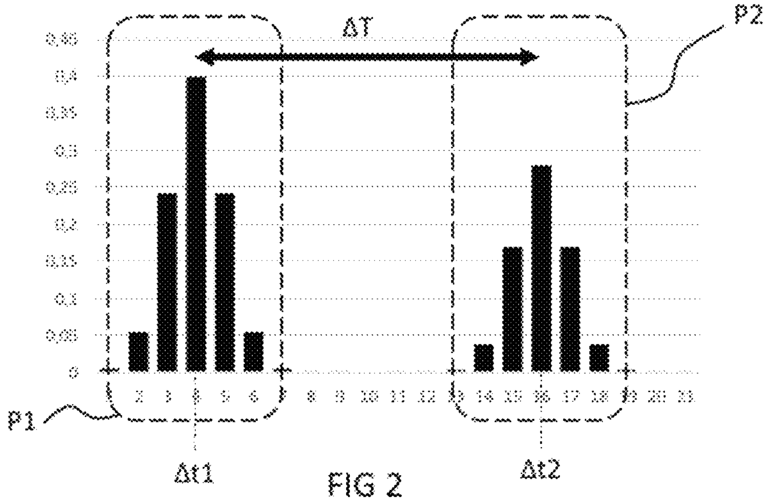
FIG. 2 schematically illustrates a distribution of the times-of-flight associated with the signal received by the second UWB module, in the system of FIG. 1.

FIG. 2 illustrates a graphical representation of said distribution of the time-of-flight values, in the form of a histogram. The x-axis is a time-of-flight, as a unit of time. The y-axis is a number of accumulated occurrences for all the received pulses $I2_1$ and $I2_2$ (normalized number). In this example, each class corresponds to an interval of a time unit. In any case, the various classes do not overlap, even partially.

The estimation of the distance D can be based on the use of a table, linking distance values D and time-of-flight values, and stored in a memory accessed by the main computer 13. The table can be obtained during a preliminary calibration step, using obstacles located at known distances.

As illustrated in FIG. 2, the distribution of the time-of-flight values comprises two distinct populations P1 and P2.

The population P1 consolidates a first set of times-of-flight associated with the first contribution $S2_1$, as mentioned above.

The population P2 consolidates a second set of times-of-flight associated with the second contribution $S2_2$, as mentioned above.

In practice, groups of time-of-flight values are sought in order to identify the two populations P1 and P2.

In a first variant of the invention, the main computer 13 is configured to estimate the distance D, solely based on the times-of-flight of the population P2. For example, the distance D is defined based on an average time-of-flight value on the population P2, or a median time-of-flight value on the population P2, or a time-of-flight value associated with a maximum number of occurrences on the population P2, etc.

In a second, more improved variant, the main computer also takes into account the times-of-flight of the population P1 to estimate the distance D.

In particular, the main computer 13 is advantageously configured to determine the time difference $\Delta T$ between the populations P1 and P2, and to estimate the distance D based on this time difference $\Delta T$.

The time difference $\Delta T$ is equal to a difference between a first reference time-of-flight $\Delta t1$, associated with the population P1, and a second reference time-of-flight $\Delta t2$, associated with the population P2.

The first and second reference times-of-flight each can be:

- a time-of-flight associated with a maximum number of occurrences on the considered population; or
- an average value of the time-of-flight on the considered population;
- a median value of the time-of-flight on the considered population; etc.

The estimation of the distance D based on the time difference $\Delta T$ is advantageously based on the use of a table, stored in a memory accessed by the main computer 13, and linking together time difference values $\Delta T$ and distance values D between the obstacle and the motor vehicle. The table can be obtained during a preliminary calibration step, using obstacles located at known distances.

In this second variant, the distance estimation is therefore carried out based on a time difference between:

- the duration required for the radio frequency signal to propagate directly from the first UWB module 11 to the second UWB module 12, without passing through the obstacle 30 (first contribution $S2_1$); and
- the duration required for the radio frequency signal to propagate from the first UWB module 11 to the second UWB module 12, passing through the obstacle 30 (second contribution $S2_2$).

This second variant thus allows, by construction, a bias to be circumvented on the time-of-flight measurements. In other words, a differential measurement is carried out, allowing the errors inherent in the time-of-flight measurement to be eliminated.

Figure 3A:
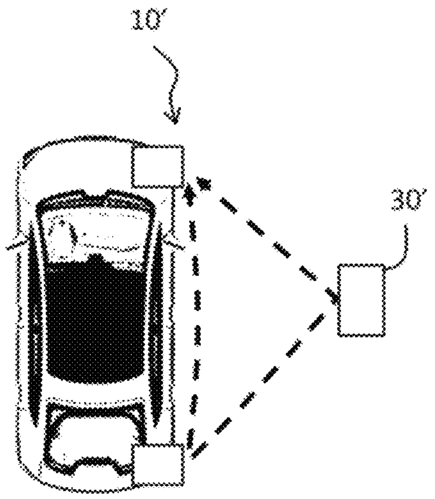
FIG. 3A schematically illustrates a system according to a variant of FIG. 1, during use with a small obstacle.

FIG. 3A illustrates a system 10' according to the invention, which only differs from the system of FIG. 1 in that the main computer is further configured to:

- compute a time spread of the population P2 associated with the second contribution;
- estimate a size of the obstacle, using the computed time spread E.

The size of the obstacle in this case denotes its dimension along an axis parallel to the axis connecting the transmitter UWB module and the second UWB module, in the system according to the invention.

Once again, the estimation can be based on the use of a table, linking obstacle size values and time spread values, and stored in a memory accessed by the main computer. The table can be obtained during a preliminary calibration step, using obstacles.

In FIG. 3A, the system 10' is shown during use with a small obstacle 30'.

Figure 3B:
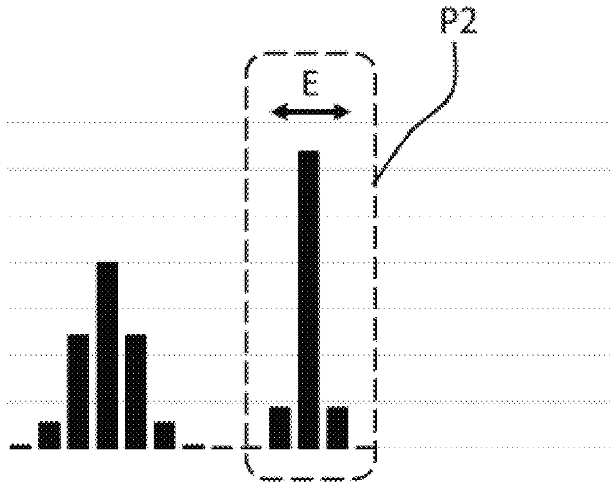
FIG. 3B schematically illustrates the distribution of the times-of-flight, obtained in the use illustrated in FIG. 3A.

FIG. 3B shows the histogram of the times-of-flight, associated with the received signal S2 and obtained when using the system 10' as illustrated in FIG. 3A, i.e., with a small obstacle 30'.

FIG. 3B shows that a small obstacle 30' is associated with a low time spread E of the population P2, with the population P2 being associated with a reflection on the obstacle 30', as described above.

Figure 4A:
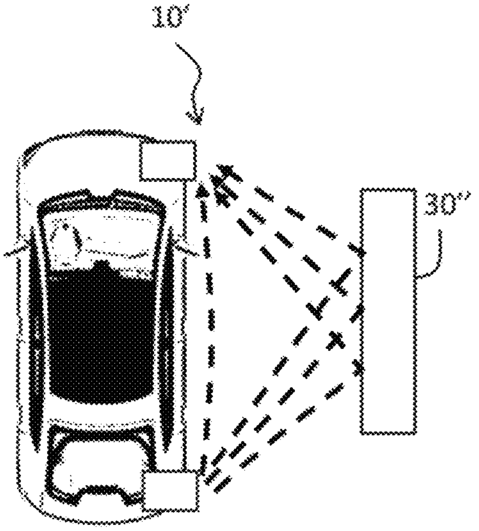
FIG. 4A schematically illustrates the system of FIG. 3A, during use with a large obstacle.

FIG. 4A shows the system 10' of FIG. 3A, but this time when used with a large obstacle 30". The other parameters are unchanged, notably the distance to the obstacle.

Figure 4B:
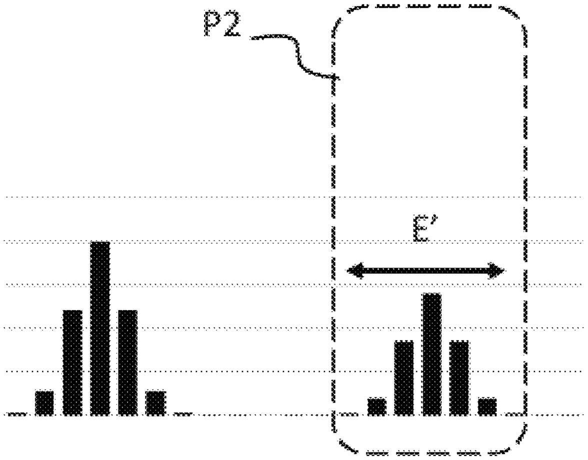
FIG. 4B schematically illustrates the distribution of the times-of-flight, obtained in the use illustrated in FIG. 4A.

FIG. 4B, shows the histogram of the times-of-flight, associated with the received signal S2 and obtained when using the system 10' as illustrated in FIG. 4A, i.e., with a large obstacle 30".

FIG. 4B shows that a large obstacle 30" is associated with a significant time spread E' of the population P2.

Indeed, a larger obstacle means more possibilities for optical paths connecting the first UWB module and the second UWB module. More possibilities for optical paths involves a wider variety of measured times-of-flight, and therefore a greater time spread of the population P2.

Figure 5A:
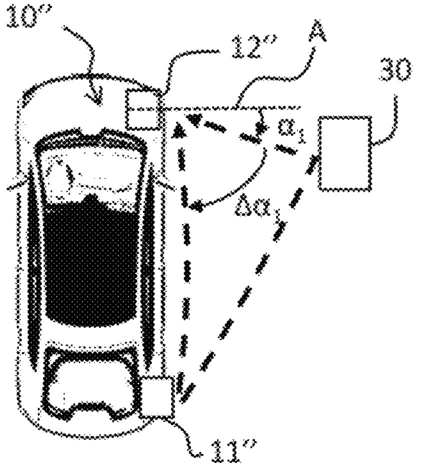
FIG. 5A schematically illustrates a system according to a variant of FIG. 1, during use with a first angle of inclination of the axis connecting the second UWB module and the obstacle.

FIG. 5A illustrates a system 10" according to the invention, which only differs from the system of FIG. 1 in that the second UWB module 12" comprises an antenna array (not shown), and in that the main computer is further configured to:

- determine at least one angle of arrival (or angle of incidence) of the received signal, using time offsets between signal reception times by the various antennas of the antenna array;
- determine, using the at least one angle of arrival and the estimated distance between the obstacle and the motor vehicle, a position of the obstacle 30 relative to the motor vehicle.

In a manner known per se, the use of an antenna array for reception allows an angle of arrival of the received signal to be determined. To this end, this is based on the measurement of at least one time offset between:

- a time for receiving rays of a signal (for example, a given pulse), by one of the antenna of the array; and
- a time for receiving rays of the same signal (for example, of the same given pulse), by another antenna of the array.

The main computer geometrically determines the position of the obstacle based on this angle of arrival and on the distance D between the motor vehicle and the obstacle. It is thus possible to accurately determine the position of the obstacle relative to the motor vehicle, without computing triangulation and without having to have several distance measurements.

FIG. 5A shows the system 10" during use with an obstacle 30 with an angle of arrival that assumes a value $\alpha_1$.

The angles of arrival are defined relative to the normal to an axis A. The axis A is substantially oriented along the normal to an axis connecting the first UWB module 11" and the second UWB module 12".

Advantageously, and as described above, the transmitted signal S1 is advantageously formed by a plurality of pulses. Each pulse 11 of the transmitted signal S1 corresponds to two pulses 121 and $I2_2$ in the received signal S2, as described above.

Advantageously, the main computer is then configured to implement the following processing operations:

compute, for each pulse $I2_1$ and $I2_2$ of the received signal S2, a respective angle of arrival value, called elementary angle of arrival value;

distribute the elementary angle of arrival values into a plurality of classes, where each class is associated with a predetermined range of elementary angle of arrival values; and estimate the angle of arrival of the second contribution of the received signal, using the distribution of the angle of arrival values of the pulses 121 and 122.

Figure 5B:
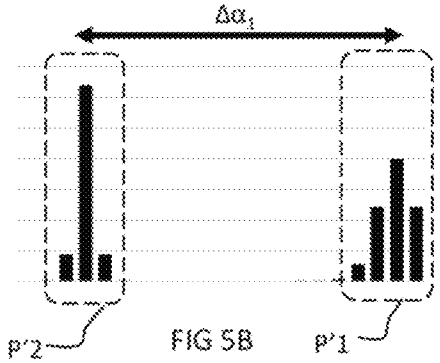
FIG. 5B schematically illustrates the distribution of the angles of arrival, obtained in the use illustrated in FIG. 5A.

FIG. 5B shows the histogram of the elementary angle of arrival values associated with the pulses 121 and 122, and obtained when using the system 10" illustrated in FIG. 5A (i.e., with an obstacle substantially located facing the second UWB module).

In the histogram, the x-axis is an elementary angle of arrival value, i.e., an angle of arrival of a pulse. The y-axis is a number of accumulated occurrences for all the received pulses 121 and 122 (normalized number). Each class corresponds to a range of angle values. The various classes do not overlap, even partially.

As shown in FIG. 5A, the distribution of the angle of arrival values comprises two distinct populations P'1 and P'2.

The population P'1 consolidates a first set of angles of arrival, associated with the pulses $I2_1$ (in this case angle values close to 90°, given the reference axis for defining the angles of arrival).

The population P'2 consolidates a second set of angles of arrival, associated with the pulses $I2_2$.

In practice, groups of angle of arrival values are sought in order to identify the two populations P'1 and P'2.

The angles of arrival are defined relative to the normal to an axis connecting the first UWB module 11" and the second UWB module 12".

In a first variant, the main computer is configured to estimate the angle of arrival of the second contribution of the received signal, based on the single population P'2. For example, the angle of arrival of the second contribution of the received signal is defined as being the average value of the angle of arrival on the population P'2, or the median value of the angle of arrival on the population P2, or an angle of arrival value associated with a maximum number of occurrences on the population P2.

As a variant, the main computer also takes into account the angles of arrival of the population P'1 to estimate the angle of arrival of the second contribution of the received signal. In particular, the main computer is then advantageously configured to determine the angular deviation $\Delta\alpha_1$ between the populations P'1 and P'2, and to deduce therefrom the angle of arrival of the second contribution of the received signal.

This variant allows an invariable and known reference axis to be available for defining the angle of arrival, unlike the aforementioned angle A. In this case, the reference axis is defined by the axis connecting the first UWB module 11" and the second UWB module 12".

The angle of arrival of the second contribution of the received signal can be defined as being directly equal to the angular deviation $\Delta\alpha_1$. As a variant, this angle of arrival can be defined as being equal to $\Delta\alpha_1-90°$.

The angular deviation $\Delta\alpha_1$ is equal to the difference between a first reference angle of arrival, associated with the population P'1, and a second reference angle of arrival, associated with the population P'2.

The first and second reference angles of arrival each can be:

an angle of arrival associated with a maximum number of occurrences on the considered population; or an average value of the angle of arrival, associated with the considered population;

a median value of the angle of arrival, associated with the considered population; etc.

Figure 6A:
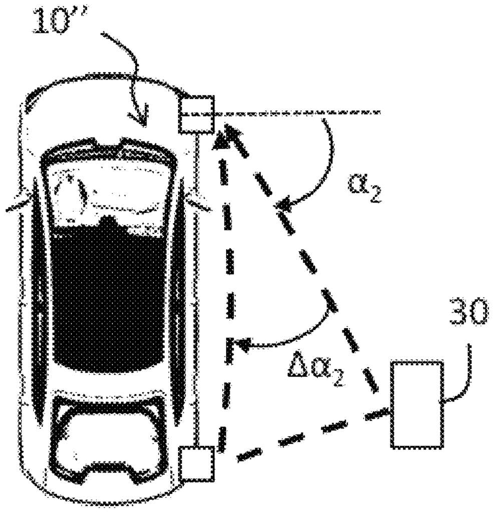
FIG. 6A schematically illustrates the system of FIG. 5A, during use with a second angle of inclination of the axis connecting the second UWB module and the obstacle.

FIG. 6A shows the system 10" of FIG. 5A, but this time when used with an obstacle 30 remote from the second UWB module. This use corresponds to a value $\alpha_2$ of the angle of arrival, and to an angular deviation $\Delta\alpha_2$ between the populations P'1 and P'2. The other parameters are unchanged, notably the distance to the obstacle.

Figure 6B:
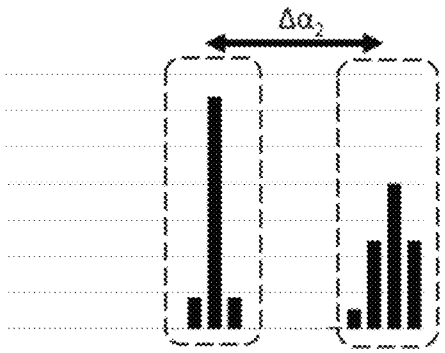
FIG. 6B schematically illustrates the distribution of the angles of arrival, obtained in the use illustrated in FIG. 6A.

FIG. 6B shows the histogram of the elementary angle of arrival values associated with the pulses 121 and 122 obtained during the use of the system 10" illustrated in FIG. 6A. As expected, a reduced deviation can be seen between the populations P'1 and P'2, corresponding to a lower angular deviation value compared with the case illustrated in FIGS. 5A and 5B.

Although described separately, the variants of FIGS. 3A to 4B, and FIGS. 5A to 6B, can be combined.

Figure 7:
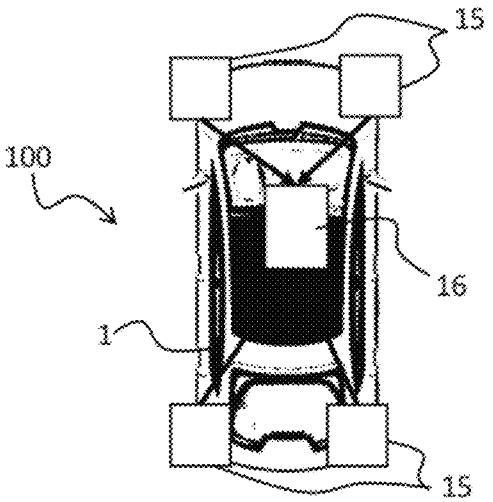
FIG. 7 schematically illustrates an obstacle detection system according to a second embodiment of the invention, installed on a motor vehicle.

Finally, FIG. 7 schematically illustrates a system 100 according to the invention that comprises a plurality of UWB modules 15 and a central computer 16.

In this case, but in a non-limiting manner, the system 100 comprises four UWB modules, distributed for use over the four corners of the motor vehicle 1.

Each of the UWB modules is configured to form both a first UWB module and a second UWB module, as described above.

The central computer 16 can include the main computer as described above.

The computer 16 is further configured to:

receive, from at least two of the UWB modules 15, a current distance value to the UWB fob 20 (obtained using a two-way communication between the respective UWB module 15 and the UWB fob 20, as described above);

compute, using said current distance values, a current position of the UWB fob 20 relative to the motor vehicle 1 (triangulation computation); and control the locking and/or unlocking of at least one opening element of the motor vehicle 1, notably as a function of the computed position of the UWB fob 20.

The system 100 therefore integrates the first UWB module, the second UWB module and the main computer according to the invention. It is further configured to determine a position of the UWB fob relative to the vehicle, and to accordingly control the locking and/or unlocking of an opening element of the motor vehicle 1.

A current distance value to the UWB fob is determined, in a manner known per se, using timestamp data generated on said fob, and timestamp data generated on a UWB module and incorporated into a signal sent by the UWB fob to the UWB module.

In variants, not shown, the system 100 includes a different number of UWB modules 15, for example, two UWB modules 15, each installed on a respective B-pillar of the vehicle, or more than four UWB modules 15 installed in the four corners of the vehicle and in the center or on a B-pillar of the vehicle.

The invention also relates to an obstacle detection method implemented in a system as described above, for example, the system 10, and comprising the following steps:

transmitting the transmitted signal S1, via the first UWB module 11 and outside the motor vehicle 1;

receiving the received signal S2, via the second UWB module 12, with the received signal S2 comprising a first contribution $S2_1$ formed by part of the transmitted signal originating directly from the first UWB module 11, and a second contribution $S2_2$ formed by part of the transmitted signal being reflected on an obstacle 30 before reaching the second UWB module 12;

computing, using the main computer 13, time-of-flight values associated with the received signal S2, and estimating a distance D between the obstacle 30 and the motor vehicle 1 based on said time-of-flight values.

The method can include prior steps of transmitting and receiving signals, for obtaining timestamp data useful for the time-of-flight computations.

The method can further include steps of:

generating and storing timestamp data relating to signal transmission and/or reception times, on a UWB module;

transmitting this timestamp data to another UWB module; and said other module receiving said timestamp data and sending it to the main computer to be used for computing time-of-flight values.

In any case, the method further comprises the following steps, implemented within each module from among the second UWB module 12 and the first UWB module 11:

establishing two-way exchanges between the UWB fob 20 and the first UWB module 11, respectively the receiver 12;

determining a current distance value between the UWB fob 20 and the first UWB module 11, respectively the receiver 12.

The invention claimed is:

1. An obstacle detection system intended configured to be installed on a motor vehicle to detect obstacles located outside the vehicle, the obstacle detection system comprising:

a first Ultra-Wide Band (UWB) module installed for use on the motor vehicle and configured to establish a two-way exchange of ultra-wideband radio frequency signals with a UWB fob and to determine a current distance value to said UWB fob, the UWB fob being carried for use by a user wishing to access the motor vehicle;

a second UWB module installed for use on the motor vehicle and configured to establish a two-way exchange of ultra-wideband radio frequency signals with said UWB fob, and to determine a current distance value to said UWB fob; and a central computer, configured to:

receive, from each respective module from among the first UWB module and the second UWB module, a current distance value to the UWB fob, compute, using said current distance values, a current position of the UWB fob relative to said motor vehicle; and control locking and/or unlocking of at least one opening element of the motor vehicle as a function of at least one current position of the UWB fob relative to said motor vehicle, wherein the first UWB module is configured to transmit a transmitted ultra-wideband radio frequency signal, of the ultra-wideband radio frequency signals, transmitted outside the motor vehicle during use, the second UWB module is configured to receive a received ultra-wideband radio frequency signal, of the ultra-wideband radio frequency signals, the received ultra-wideband radio frequency signal originating from the transmitted signal and comprising a first contribution originating directly from the first UWB module and a second contribution reflected on an obstacle before reaching the second UWB module, and the system comprises at least one main computer distinct from or combined with the central computer, which form an integral part of the second UWB module, and which is configured to receive data relating to the received signal as input, and to deduce time-of-flight values therefrom and then estimate a distance between an obstacle and the motor vehicle.

2. The system as claimed in claim 1, wherein the first UWB module and the second UWB module are configured to together establish a two-way communication, and to exchange timestamp data relating to signal transmission and/or reception times, and the central computer is configured to use said timestamp data to obtain said time-of-flight values.

3. The system as claimed in claim 1, wherein the transmitted signal is made up of a plurality of pulses, with each pulse of the transmitted signal corresponding to two respective pulses of the received signal, respectively associated with the first contribution and with the second contribution, the at least one main computer being configured to:

compute, for each pulse of the received signal, a respective time-of-flight value of the time-of-flight values, distribute the time-of-flight values into a plurality of classes, where each class is associated with a predetermined range of values of the time-of-flight, and estimate the distance between the obstacle and the motor vehicle using said distribution of the time-of-flight values.

4. The system as claimed in claim 1, wherein the at least one main computer is configured to:

identify, on said distribution of the time-of-flight values, two populations respectively associated with the first contribution and with the second contribution, determine a time difference between the two time-of-flight populations and estimate the distance between the obstacle and the motor vehicle using said time difference.

5. The system as claimed in claim 1, further comprising a memory, storing a first table linking together values relating to times-of-flight and distance values between the obstacle and the motor vehicle, and the at least one main computer is configured to estimate the distance between the obstacle and the motor vehicle using said first table.

6. The system as claimed in claim 4, characterized in that wherein the at least one main computer is further configured to:

compute a time spread of the population associated with the second contribution, estimate a size of the obstacle, using the computed time spread.

7. The system as claimed in claim 6, further comprising a memory, storing a second table linking together time spread values and size values of the obstacle, and in that the main computer is configured to estimate the size of the obstacle using said second table.

8. The system as claimed in claim 1, wherein the second UWB module comprises an antenna array, and the at least one main computer is configured to:

determine at least one angle of arrival of the received signal, using a time offset between signal reception times by the various antennas of the antenna array, and determine, using the at least one angle of arrival of the received signal and the estimated distance between the obstacle and the motor vehicle, a position of the obstacle relative to the motor vehicle.

9. The system as claimed in claim 8, wherein the transmitted signal is made up of a plurality of pulses, with each pulse of the transmitted signal corresponding to two respective pulses of the received signal, respectively associated with the first contribution and with the second contribution, the main computer being configured to:

compute, for each pulse of the received signal, a respective angle of arrival value, called elementary angle of arrival value, distribute the elementary angle of arrival values into a plurality of classes, where each class is associated with a predetermined range of elementary angle of arrival values, and estimate an angle of arrival of the second contribution of the received signal, using said distribution of the elementary angle of arrival values.

10. The system as claimed in claim 9, wherein the at least one main computer is configured to:

identify, on said distribution of the elementary angle of arrival values, two populations respectively associated with the first contribution and with the second contribution, determine the angular deviation between the two populations of elementary angle of arrival values, and estimate the angle of arrival of the second contribution of the received signal, using said angular deviation.

11. The system as claimed in claim 1, wherein the first UWB module and the second UWB module are interchangeable, and each form a transceiver UWB module.

12. A motor vehicle comprising the system as claimed in claim 1.

13. An obstacle detection method, implemented in the obstacle detection system as claimed in claim 1, the method comprising:

transmitting the transmitted signal, via the first UWB module and outside the motor vehicle;

receiving the received signal, via the second UWB module, with the received signal comprising the first contribution formed by part of the transmitted signal originating directly from the first UWB module, and the second contribution formed by part of the transmitted signal reflected on the obstacle before reaching the second UWB module;

computing, using the main computer, the time-of-flight values associated with the received signal, and estimating the distance between the obstacle and the motor vehicle based on said time-of-flight values; and implemented within each module from among the second UWB module and the first UWB module:

establishing two-way exchanges between the UWB fob and respectively said first UWB module and the second UWB module, and determining a current distance value between the UWB fob and respectively said first UWB module and the second UWB module.

* * * * *